United States Patent
Grinko

(10) Patent No.: US 11,407,048 B2
(45) Date of Patent: Aug. 9, 2022

(54) METHOD FOR PRODUCING A WORKPIECE PROVIDED WITH A TOOTHING OR PROFILING

(71) Applicant: KAPP NILES GmbH & Co. KG, Coburg (DE)

(72) Inventor: Sergiy Grinko, Coburg (DE)

(73) Assignee: KAPP NILES GMBH & CO. KG, Coburg (DE)

( * ) Notice: Subject to any disclaimer, the term of this patent is extended or adjusted under 35 U.S.C. 154(b) by 249 days.

(21) Appl. No.: 16/886,928

(22) Filed: May 29, 2020

(65) Prior Publication Data
US 2020/0384557 A1    Dec. 10, 2020

(30) Foreign Application Priority Data
Jun. 6, 2019    (DE) ...................... 10 2019 115 294.1

(51) Int. Cl.
*B23F 13/02*    (2006.01)
*B23P 15/14*    (2006.01)
*B24C 1/10*    (2006.01)

(52) U.S. Cl.
CPC .............. *B23F 13/02* (2013.01); *B23P 15/14* (2013.01); *B24C 1/10* (2013.01); *Y10T 29/477* (2015.01); *Y10T 29/49476* (2015.01)

(58) Field of Classification Search
CPC ............. B23F 13/02; B23P 15/14; B24C 1/10
See application file for complete search history.

(56) References Cited

U.S. PATENT DOCUMENTS

| | | | |
|---|---|---|---|
| 3,913,281 A * | 10/1975 | Jones | B24D 3/16 51/307 |
| 4,961,289 A | 10/1990 | Sulzer | |
| 6,058,584 A | 5/2000 | Matsuyama | |
| 6,315,646 B1 * | 11/2001 | Hoyashita | B23F 19/00 451/37 |
| 6,402,607 B2 * | 6/2002 | Reichert | B24D 3/14 451/544 |
| 7,832,070 B2 | 11/2010 | Mordukhovich | |
| 10,507,538 B2 | 12/2019 | Mueller | |

(Continued)

FOREIGN PATENT DOCUMENTS

| CN | 109027035 A | 12/2018 |
|---|---|---|
| DE | 19744435 A1 | 4/1998 |
| DE | 102007035846 A1 | 2/2008 |

(Continued)

*Primary Examiner* — Sarang Afzali
(74) *Attorney, Agent, or Firm* — Lucas & Mercanti, LLP; Klaus P. Stoffel

(57) ABSTRACT

A method for producing a workpiece having a toothing or profiling, including the steps: a) soft machining the workpiece to produce the toothing or profiling; b) hardening the toothing or profiling; c) hard fine machining the toothing or profiling with a first tool that is a grinding worm, a grinding wheel or a honing wheel, wherein the first tool has a base body with a first elastic modulus; d) reinforcement of at least a section of the workpiece by shot blasting; and, following step d), e) repeated hard fine machining of the toothing or profiling with a second tool that is a grinding worm, a grinding wheel, a set of grinding wheels or a honing wheel. The second tool has a plastic or rubber base body with a second elastic modulus which is at most 33% of the first elastic modulus.

12 Claims, 2 Drawing Sheets

(56) References Cited

U.S. PATENT DOCUMENTS 10,843,497 B2 * 11/2020 Minamidate ...... B32B 17/10458
2017/0261068 A1 9/2017 Zhao

FOREIGN PATENT DOCUMENTS

DE 102015224644 A1 6/2017
DE 102016005305 A1 11/2017
EP 0282046 A2 9/1988

* cited by examiner

METHOD FOR PRODUCING A WORKPIECE PROVIDED WITH A TOOTHING OR PROFILING

CROSS-REFERENCE TO RELATED APPLICATIONS

The present application claims priority of DE 10 2019 115 294.1, filed Jun. 6, 2019, the priority of this application is hereby claimed and this application is incorporated herein by reference.

BACKGROUND OF THE INVENTION

The invention relates to a method for producing a workpiece provided with a toothing or profiling, comprising the sequence of steps:
 a) Soft machining of the workpiece, in which the toothing or profiling is produced;
 b) Hardening of the manufactured toothing or profiling;
 c) Hard fine machining of the toothing or profiling, wherein the toothing or profiling is machined with a first tool in the form of a grinding worm, a grinding wheel or a honing wheel, wherein the tool has a base body which has a first elastic modulus;
 d) Reinforcement of at least a section of the workpiece by carrying out a shot blasting process;

The mentioned method is typically used as a process chain in the manufacture of gears or profiles. It includes the usually intended soft machining of the gear teeth, followed by a heat treatment that hardens the surface of the tooth flanks. This is followed by the hard fine machining.

In soft machining, the workpieces are pre-geared, for example by milling, slotting or peeling. After the heat treatment, especially in the form of case hardening, quenching and tempering and induction hardening, the workpieces must be reworked, as they do not yet have sufficient toothing or surface quality, especially due to the residual stock allowance, due to hardening distortions or as a result of surface layer oxidation. Hard machining is usually carried out in the form of abrasive machining, whereby grinding, honing or so-called coroning should be mentioned in particular. Often the process chain is completed with the execution of the hard fine machining, whereby the workpieces then have a sufficient toothing or surface quality.

If the required gear tooth or surface qualities are not achieved with this process, additional processes such as polishing grinding, vibratory grinding or drag finishing can be used. This process step follows the hard fine machining.

To increase the load-bearing capacity of the root or flank area of the toothing or profile, the process chain is often supplemented by a process step for hardening (or reinforcement). After the creation of the finished geometry by grinding, honing, etc., the workpieces are then treated by shot blasting (e.g. shot peening).

The strength of the toothing or profile is thus increased in an advantageous way. The disadvantage, however, is that sometimes after the shot blasting treatment the surface quality of the toothing or profile no longer corresponds to the desired quality. This can make further treatment of the workpiece necessary.

Such a procedure is mentioned in DE 10 2007 035 846 A1 in the discussion of the state of the art (see paragraph [0004] of the document). After the manufacture of a gear by soft machining, the subsequent hardening and the hard machining, shot peening of the machined profile is provided for there. It is also mentioned that polishing and/or glass-blasting may follow, although no further details are given about these steps. The aim of the procedure described in the document is rather that the gear profile is not reinforced at all, but only the tooth root, so that it is suggested that each root surface is plastically deformed to a sufficient depth without plastically deforming the flank sections.

Grinding or honing is out of the question at this point, since the removal of a (further) stock from the tooth flank cuts and thus removes the reinforced material, thus eliminating the reinforcement effect. In order to improve the existing surface quality, the flanks must therefore be machined with a very small amount of material removed, as otherwise the hardening or reinforcing effect is partially or completely removed from the workpiece. If grinding or honing is used for this purpose, the corresponding tools must be positioned or aligned very precisely in the gear gap. Although the workpieces have a finished geometry, the geometric parameters fluctuate within a tolerance band. In addition, the alignment process can only be carried out with limited accuracy (with regard to symmetry). This means that the stock or allowance to be ground must be at least as large as the sum of all errors during alignment in order to reliably produce the required geometry. In practice, this has the disadvantage of increasing stock removal and eliminating the desired hardened layer.

For this reason, vibratory grinding is usually used in this case, in which the surface treated in this way only undergoes removal in the roughness area without any change in the overall geometry. This process can also be carried out with chemical support if necessary.

Sometimes, however, even this procedure does not lead to the desired result or it results in correspondingly high process costs.

DE 10 2016 005 305 A1 describes a manufacturing process for gears using a grinding worm with two adjacent machining sections. The first machining section is used for classical grinding. Then the tool is shifted in axial direction so that the second machining section can be used. However, the swivel angle between the tool and the workpiece is slightly changed to perform fine grinding or polishing. Since only minimal material removal is to be achieved by fine grinding or polishing, and the swivel angle is also only slightly changed (see FIG. 4 of the document), precise positioning between the workpiece and the tool is very important here, so that a process step between grinding and fine grinding/polishing, which would require removal of the workpiece and subsequent re-entry into the machine, cannot be considered. Instead, the same workpiece clamping is emphasized for grinding and subsequent fine grinding/polishing (see paragraphs [0028] and [0029] of the document).

SUMMARY OF THE INVENTION

The invention is therefore based on the object of further developing a generic process in such a way that the production of a workpiece with a toothing or a profile can be further improved, whereby the workpiece should exhibit both high strength and sufficient accuracy. In addition, the process should also work economically.

The solution of this object by the invention proposes that following above step d) the step is carried out:
 e) Repeated hard fine machining of the toothing or profiling, wherein the toothing or profiling being machined with a second tool in the form of a grinding worm, a grinding wheel, a set of grinding wheels or a honing wheel, wherein the second tool having a base body which has a second elastic modulus which is at most 33%, preferably at most 25%, of the first elastic modulus, and wherein the second tool has a base body made of a plastic or rubber.

Preferably, the second elastic modulus is even at most 10% of the first elastic modulus, specifically preferred at most 5% of the first elastic modulus.

The first tool used according to above step c) has preferably a base body of steel or of ceramic material with embedded corundum.

The first tool used according to above step c) is according to a specifically preferred embodiment of the invention a grinding worm which is profiled or dressed according to the toothing or profile to be machined.

Another solution provides that the first tool used according to above step c) is a steel grinding wheel or set of grinding wheels coated with abrasive material.

The second tool used according to above step e) has preferably a base body made of polyurethane.

The second tool used according to above step e) has specifically preferred a base body in which abrasive material is embedded and which is shaped according to the toothing or profiling to be machined.

The shot blasting process carried out according to above step d) is preferably a shot peening process, in particular using metal spheres or glass spheres.

After above step d) and before above step e) the workpiece can be cleaned, in particular washed.

The proposed method thus provides a process chain especially for tooth flank machining with high surface quality. The process chain comprises, in particular for the hard fine machining of the tooth flanks of a gear with high surface quality, the polishing grinding following of the usual gear grinding (or gear honing) and shot blasting or shot peening with a tool whose basic body is relatively soft and therefore yielding.

The proposed procedure provides a novel process chain, whereby vibratory grinding is dispensed with; this process step is rather performed by a polishing-grinding process with a grinding-like tool (in particular with a grinding worm or a grinding wheel), said tool having a base or body of relatively elastic material, in particular polyurethane, or a material comprising polyurethane or rubber.

The use of such a (second) tool, which functions as a polishing tool and which is relatively elastic, has the following advantages:

Machining with such a tool is done by the (internal) preload of the tool in the gear gap. This makes it possible to compensate for any possible remaining errors in the workpiece geometry or the alignment process thanks to the flexible tool body.

The stock to be ground is only in the range of the surface quality. This ensures that the hardened or reinforced material layer on the tooth flank is not damaged and remains on it.

After the hardening treatment, the workpieces either go directly to the polishing grinding process (with the second tool) or are first washed or cleaned. The polishing grinding treatment (by means of the second tool) is preferably carried out either by means of a grinding worm with elastic bond or by means of a profile wheel or a set of profile wheels with elastic bond.

The machining (according to above steps c) and e)) can also be carried out with a combined tool, in which at least one area or part of the tool has the elastic bond; it is then a combined tool with which first the hard fine machining according to above step c) and then the polishing grinding according to above step e) can be carried out, whereby different sections of the tool are used.

The elastic modulus (Young's modulus) referred to in the present invention is sufficiently well known as such that it does not need to be further described here. It is a material parameter which, in the case of linear-elastic behaviour, describes the proportional relationship between the applied stress and the achieved elongation during the deformation of a solid body. It is specified in $N/m^2$ or in $N/mm^2$.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

DETAILED DESCRIPTION OF THE INVENTION

Figure 1:
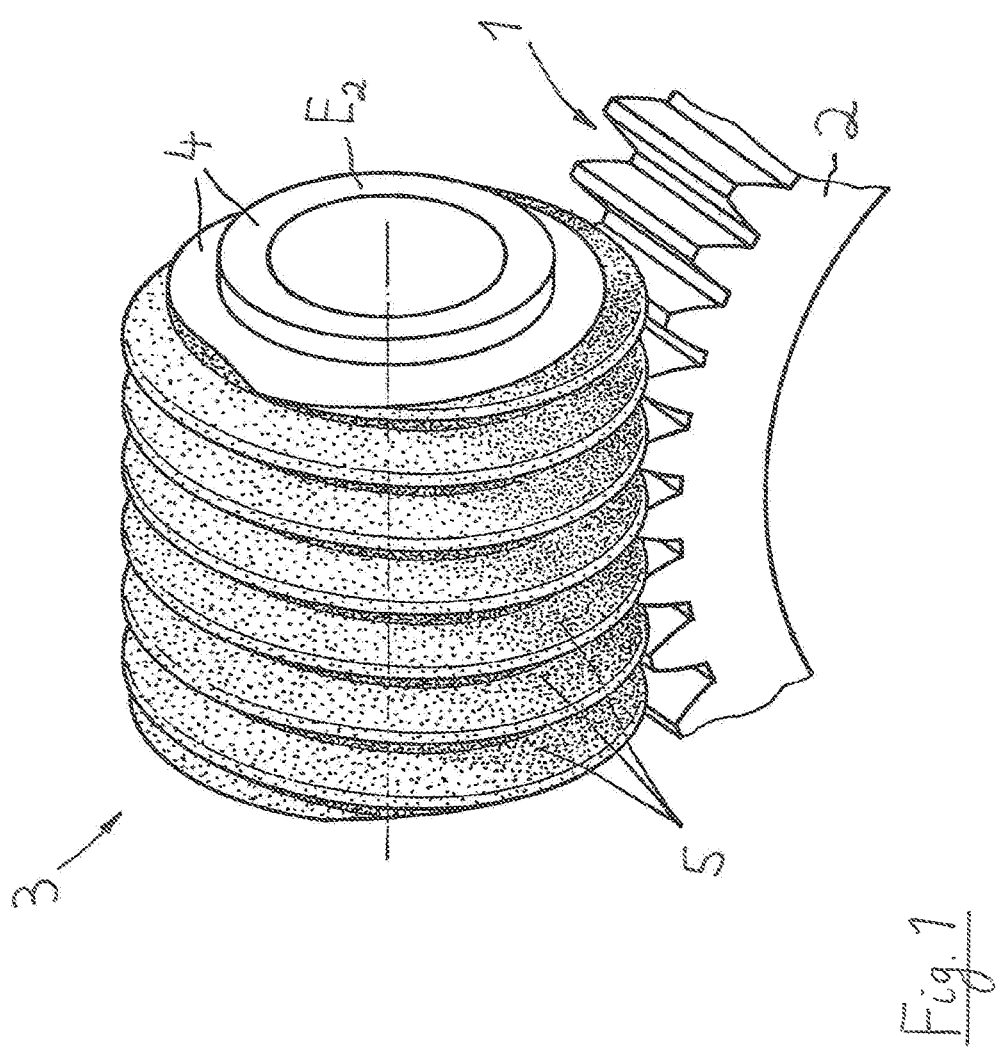
FIG. 1 show in perspective view a workpiece to be machined in the form of a gear wheel which is polished ground by a worm-shaped tool.

In FIG. 1 a partial step of the proposed manufacturing process for the production of a workpiece 2 in the form of a gearwheel is depicted; workpiece 2 has a toothing 1, which is to be produced with high geometric precision and high surface quality.

Shown is the step of polishing grinding by means of a tool 3 in the form of a grinding worm. The grinding worm 3 has a base body 4, which in the shown embodiment consists of polyurethane. Abrasive particles are embedded in the material of the base body 4, so that abrasive areas 5 are formed on the surface of the grinding worm 3, which are used for machining the toothing 1.

Figure 2:
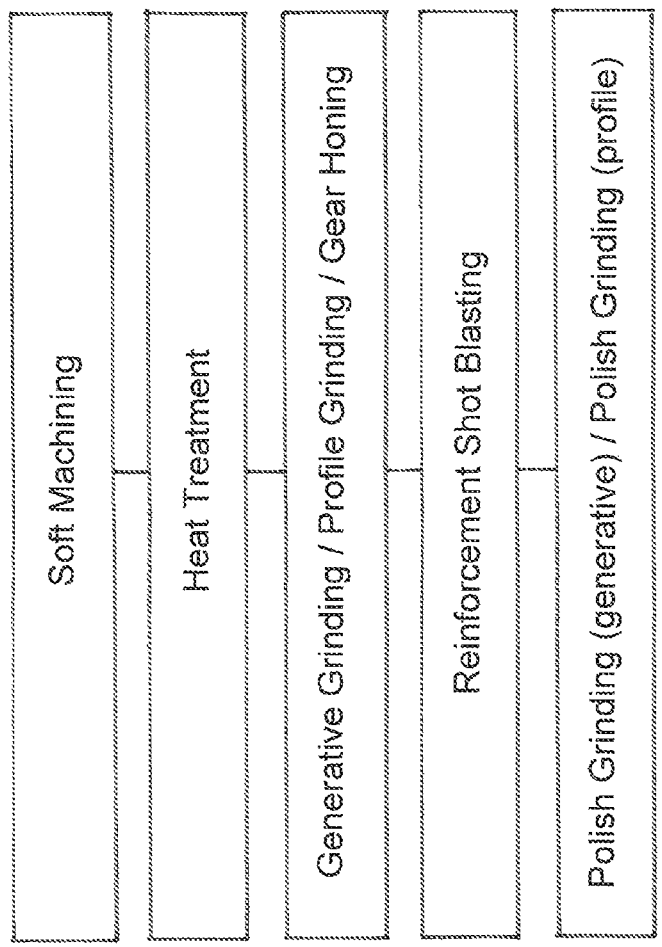
FIG. 2 shows a flow chart for the method according to the invention.

The entire production process of workpiece 2 is shown in FIG. 2.

Accordingly, the soft machining is carried out first, in which the toothing 1 is machined into a metallic base body. This can be done by hobbing, for example.

The soft machining is followed by the heat treatment which hardens the tooth flanks.

Once workpiece 2 has been hardened, the next machining step is hard finishing. FIG. 2 shows three alternative options, namely generative grinding (generative grinding), profile grinding and gear honing. If generative grinding is carried out with a grinding worm, the situation is the same as shown in FIG. 1, except that a largely rigid tool 3 is used, which undergoes practically no deformation when the forces occur during grinding. For this purpose, for example, a ceramic base body 4 is used as the grinding worm, in which corundum grains are embedded, whereby the grinding worm is provided with the required abrasive areas 5 by a dressing process. In the same way, it is also possible to use a steel base body tool which is coated with abrasive material on the surface to provide the abrasive areas 5.

FIG. 2 also shows that after hard finishing, reinforcement shot blasting is performed. This involves for example shot peening to strengthen areas of the workpiece or gear teeth. The areas to be hardened are bombarded with balls made of, for example, cast steel, wire mesh, ceramics or glass, so that the surface hardens or is reinforced.

After reinforcing, the polish grinding already described above is then carried out, which is done with a grinding worm 3 in the depicted embodiment, but this can also be done with a profile grinding wheel, for example.

Essential for this repeated hard fine machining of toothing 1 is that the tool 3, in the depicted embodiment thus the grinding worm, has a base body 4 whose elastic modulus is considerably lower than the elastic modulus of the base body of the tool with which the generative grinding, the profile grinding or the gear honing were performed after the heat treatment.

So, for example, grinding is carried out after heat treatment with a grinding worm, which has a base body of ceramic material in which corundum grains are embedded, whereby the base body was dressed according to the required shape and thus provided with the abrasive areas 5. The elastic modulus for ceramics with embedded corundum is in the range between 18,000 and 32,500 N/mm$^2$. Alternatively, the basic body can also be made of steel and have the areas or surfaces 5 coated with abrasive material; in this case the elastic modulus is 210,000 N/mm$^2$.

On the other hand, tool 3 shown in FIG. 1 is used for polish grinding, the base body 4 of which consists of polyurethane, for example, in which abrasive particles are embedded. After profiling tool 3 in the form shown in FIG. 1 (for example by casting the polyurethane with abrasive particles into a corresponding mould), similar abrasive areas 5 are thus present. The elastic modulus here, for example, is 3,500 N/mm$^2$. As an example of a material useful for the present invention, "ARTIFEX" from ARTIFEX Dr. Lohmann GmbH & Co. KG, Kaltenkirchen, DE, should be mentioned.

It follows that the elastic modulus $E_1$ of the first tool used for hard finishing after heat treatment is much higher than the elastic modulus $E_2$ of the tool used for polishing after reinforcement shot blasting. The ratio of the elastic modulus is at least 3:1, but can also be considerably higher.

The tool used for polish grinding is therefore relatively elastic and adapts to the prefabricated shape of toothing 1 without removing relevant parts of the hardened material.

While specific embodiments of the invention have been shown and described in detail to illustrate the inventive principles, it will be understood that the invention may be embodied otherwise without departing from such principles.

I claim:

1. A method for producing a workpiece provided with a toothing or profiling, comprising the sequence of steps:
   a) soft machining of the workpiece to produce the toothing or profiling;
   b) hardening of the manufactured toothing or profiling;
   c) hard fine machining of the hardened toothing or profiling, wherein the toothing or profiling is machined with a first tool in the form of a grinding worm, a grinding wheel or a honing wheel, wherein the tool has a base body which has a first elastic modulus;
   d) subsequent reinforcement of at least a section of the toothing or profiling by carrying out a shot blasting process;
   e) following step d): repeated hard fine machining of the toothing or profiling, wherein the toothing or profiling being machined with a second tool in the form of a grinding worm, a grinding wheel, a set of grinding wheels or a honing wheel, wherein the second tool having a base body which has a second elastic modulus which is at most 33% of the first elastic modulus and wherein the second tool has a base body made of a plastic or rubber.

2. The method according to claim 1, wherein the second elastic modulus is at most 10% of the first elastic modulus.

3. The method according to claim 2, wherein the second elastic modulus is at most 5% of the first elastic modulus.

4. The method according to claim 1, wherein the first tool used according to step c) has a base body of steel or of ceramic material with embedded corundum.

5. The method according to claim 4, wherein the first tool used according to step c) is a grinding worm which is profiled or dressed according to the toothing or profile to be machined.

6. The method according to claim 1, wherein the shot blasting process carried out according to step d) is a shot peening process.

7. The method according to claim 6, wherein the shot peening process uses metal spheres or glass spheres.

8. The method according to claim 1, wherein after step d) and before step e) the workpiece is cleaned.

9. The method according to claim 8, wherein after step d) and before step e) the workpiece is washed.

10. The method according to claim 1, wherein the first tool used according to step c) is a steel grinding wheel or set of grinding wheels coated with abrasive material.

11. The method according to claim 1, wherein the second tool used according to step e) has a base body made of polyurethane.

12. The method according to claim 1, wherein the second tool used according to step e) has a base body in which abrasive material is embedded and which is shaped according to the toothing or profiling to be machined.

* * * * *